United States Patent
Schmidt et al.

(10) Patent No.: US 10,869,020 B2
(45) Date of Patent: Dec. 15, 2020

(54) METHOD FOR CAPTURING IMAGES OF A PREFERABLY STRUCTURED SURFACE OF AN OBJECT AND DEVICE FOR IMAGE CAPTURE

(71) Applicants: INB Vision AG, Magdeburg (DE); Thomas Casper, Magdeburg (DE)

(72) Inventors: Wolfram Schmidt, Stadt Falkenstein (DE); Bernd Michaelis, Biederitz (DE); Robert Wagner, Neuburg am Inn (DE); Tilo Lilienblum, Magdeburg (DE); Erik Lilienblum, Magdeburg (DE)

(73) Assignee: INB Vision AG, Magdeburg (DE)

( * ) Notice: Subject to any disclaimer, the term of this patent is extended or adjusted under 35 U.S.C. 154(b) by 208 days.

(21) Appl. No.: 14/411,706

(22) PCT Filed: Jun. 27, 2013

(86) PCT No.: PCT/DE2013/200023
§ 371 (c)(1),
(2) Date: Dec. 29, 2014

(87) PCT Pub. No.: WO2014/000738
PCT Pub. Date: Jan. 3, 2014

(65) Prior Publication Data
US 2015/0324991 A1  Nov. 12, 2015

(30) Foreign Application Priority Data
Jun. 29, 2012  (DE) .................. 10 2012 211 381

(51) Int. Cl.
*G06T 7/00* (2017.01)
*G06T 7/60* (2017.01)
(Continued)

(52) U.S. Cl.
CPC ......... *H04N 13/275* (2018.05); *G01B 11/245* (2013.01); *G01B 11/2513* (2013.01);
(Continued)

(58) Field of Classification Search
CPC .............. G01B 11/245; G01B 11/2513; G01B 11/2518; G06K 7/10732; G06K 9/2036;
(Continued)

(56) References Cited

U.S. PATENT DOCUMENTS

| 4,687,325 A | 8/1987 | Corby, Jr. |
| 4,834,530 A | 5/1989 | Murai et al. |

(Continued)

FOREIGN PATENT DOCUMENTS

| DE | 4402414 C2 | 10/1997 |
| DE | 19738480 C1 | 11/1998 |

(Continued)

OTHER PUBLICATIONS

The International Bureau of WIPO, International Preliminary Report on Patentability (English translation of Written Opinion) for International Application No. PCT/DE2013/200023, dated Dec. 31, 2014, 20 pages, Switzerland.

(Continued)

*Primary Examiner* — Joon Kwon
(74) *Attorney, Agent, or Firm* — Alston & Bird LLP

(57) ABSTRACT

The invention relates to a method for capturing images of a preferably structured surface of an object, using at least one line-scan camera for scanning the surface, wherein the surface is illuminated in a structured manner and wherein for reconstruction of the surface a time-oriented evaluation and/or spatial evaluation of acquired images is effected optionally taking into account a relative movement between (Continued)

the line-scan camera and the surface. Said method is carried out by a device for capturing images of a preferably structured surface of an object.

25 Claims, 8 Drawing Sheets

(51) Int. Cl.
| | |
|---|---|
| G01B 11/25 | (2006.01) |
| G06T 17/10 | (2006.01) |
| G06T 19/20 | (2011.01) |
| G06K 7/10 | (2006.01) |
| G06K 9/20 | (2006.01) |
| G06T 1/00 | (2006.01) |
| G06T 7/20 | (2017.01) |
| H04N 13/275 | (2018.01) |
| H04N 13/243 | (2018.01) |
| G01B 11/245 | (2006.01) |
| G06T 7/579 | (2017.01) |
| G06T 7/536 | (2017.01) |
| G06T 7/62 | (2017.01) |
| G06T 7/292 | (2017.01) |

(52) U.S. Cl.
CPC ...... *G01B 11/2518* (2013.01); *G06K 7/10732* (2013.01); *G06K 9/2036* (2013.01); *G06T 1/0007* (2013.01); *G06T 7/0002* (2013.01); *G06T 7/292* (2017.01); *G06T 7/536* (2017.01); *G06T 7/579* (2017.01); *G06T 7/62* (2017.01); *G06T 17/10* (2013.01); *G06T 19/20* (2013.01); *H04N 13/243* (2018.05); *G06T 2200/04* (2013.01); *G06T 2200/21* (2013.01); *G06T 2207/10004* (2013.01); *G06T 2207/10028* (2013.01); *G06T 2207/10152* (2013.01); *G06T 2207/20076* (2013.01); *G06T 2207/20221* (2013.01); *G06T 2215/06* (2013.01); *G06T 2219/2016* (2013.01); *G06T 2219/2021* (2013.01)

(58) Field of Classification Search
CPC ....... G06T 17/10; G06T 19/20; G06T 1/0007; G06T 2200/04; G06T 2200/21; G06T 2207/10004; G06T 2207/10028; G06T 2207/10152
USPC .......................................................... 348/136
See application file for complete search history.

(56) References Cited

U.S. PATENT DOCUMENTS

| | | | | |
|---|---|---|---|---|
| 5,414,474 | A * | 5/1995 | Kamada | G06T 7/246 |
| | | | | 348/135 |
| 5,986,745 | A | 11/1999 | Hermary et al. | |
| 6,038,074 | A * | 3/2000 | Kitaguchi | G01C 11/06 |
| | | | | 128/916 |
| 6,118,475 | A * | 9/2000 | Iijima | G01C 11/06 |
| | | | | 348/42 |
| 6,542,250 | B1 | 4/2003 | Michaelis et al. | |
| 8,823,869 | B2 | 9/2014 | Beck | |
| 2002/0039187 | A1* | 4/2002 | Keranen | G01B 11/2522 |
| | | | | 356/604 |
| 2003/0072156 | A1* | 4/2003 | Pohlert | F21K 9/65 |
| | | | | 362/244 |
| 2003/0160970 | A1* | 8/2003 | Basu | G01B 11/2518 |
| | | | | 356/601 |
| 2004/0000652 | A1* | 1/2004 | Guha | G01N 21/8901 |
| | | | | 250/559.45 |
| 2006/0239537 | A1* | 10/2006 | Shragai | G06K 9/0063 |
| | | | | 382/154 |
| 2007/0002143 | A1* | 1/2007 | Elberbaum | H04N 17/002 |
| | | | | 348/188 |
| 2007/0124949 | A1* | 6/2007 | Burns, Jr. | G01B 11/2509 |
| | | | | 33/288 |
| 2007/0216894 | A1* | 9/2007 | Garcia | G01B 11/2545 |
| | | | | 356/4.01 |
| 2008/0031338 | A1* | 2/2008 | Sato | H04N 19/51 |
| | | | | 375/240.16 |
| 2008/0130015 | A1* | 6/2008 | Lu | G01B 11/25 |
| | | | | 356/610 |
| 2008/0240502 | A1* | 10/2008 | Freedman | G01B 11/2513 |
| | | | | 382/103 |
| 2009/0059241 | A1* | 3/2009 | Lapa | G01B 11/2518 |
| | | | | 356/603 |
| 2009/0167847 | A1* | 7/2009 | Doi | A61B 5/1076 |
| | | | | 348/65 |
| 2010/0091301 | A1* | 4/2010 | Masuda | G01B 11/2545 |
| | | | | 356/601 |
| 2010/0141740 | A1 | 6/2010 | Munkelt et al. | |
| 2010/0195114 | A1* | 8/2010 | Mitsumoto | G01B 11/245 |
| | | | | 356/601 |
| 2010/0239136 | A1* | 9/2010 | Gandyra | G01B 11/03 |
| | | | | 382/128 |
| 2011/0069154 | A1* | 3/2011 | Case | G01N 21/9501 |
| | | | | 348/46 |
| 2011/0090333 | A1* | 4/2011 | Haugan | G01N 21/8806 |
| | | | | 348/136 |
| 2011/0116701 | A1* | 5/2011 | Zhu | G06T 7/38 |
| | | | | 382/131 |
| 2012/0176478 | A1* | 7/2012 | Wang | G01B 11/2536 |
| | | | | 348/47 |
| 2012/0294510 | A1* | 11/2012 | Zhang | G06K 9/2036 |
| | | | | 382/154 |
| 2013/0258354 | A1* | 10/2013 | Ando | G01B 11/00 |
| | | | | 356/625 |
| 2013/0329942 | A1* | 12/2013 | Sonoda | G01B 11/2513 |
| | | | | 382/103 |

FOREIGN PATENT DOCUMENTS

| | | |
|---|---|---|
| DE | 19928341 C2 | 6/2002 |
| DE | 102007022361 A1 | 11/2008 |
| DE | 102007034689 A1 | 1/2009 |
| DE | 102008009680 A1 | 8/2009 |
| DE | 102010007396 A1 | 8/2011 |
| DE | 102010015566 A1 | 10/2011 |
| EP | 2287593 A1 | 2/2011 |
| JP | 2004117186 A | 4/2004 |

OTHER PUBLICATIONS

Albrecht, P., et al., "Improvement of the Spatial Resolution of an Optical 3-D Measurement Procedure", *IEEE Transactions on Instrumentation and Measurement*, Feb. 1998, vol. 47, No. 1, pp. 158-162, IEEE, USA.

Kanade, T., et al., "A Stereo Matching Algorithm with an Adaptive Window: Theory and Experiment", *IEEE Transactions on Pattern Analysis and Machine Intelligence*, Sep. 1994, pp. 920-932, vol. 16, Issue 9, IEEE, USA.

Shirai, Y., et al, "Recognition of Polyhedrons with a Range Finder", *Proceedings of the 2nd International Joint Conference on Artificial Intelligence*, Sep. 1971, pp. 80-87, UK.

Son, S., et al., "Automated laser scanning system for reverse engineering and inspection", *International Journal of Machine Tools and Manufacture*, Jun. 2002, pp. 889-897, vol. 42, Issue 8, Elsevier Science Ltd., UK.

Valkenburg, R. J., et al., "Accurate 3D measurement using a structured light system", *Image and Vision Computing*, 1998, vol. 16, No. 2, pp. 99-110, Elsevier Science, B.V., The Netherlands.

Wiora, G., "Optische 3D-Messtechnik: Präzise Gestaltvermessung mit einem erweiterten Streifenprojektionsverfahren" (Optical 3D measuring technology: precise shape measurement with an advanced

(56) References Cited

OTHER PUBLICATIONS stripe projection method), Dissertation, 2001, Heidelberg University, Germany.
Lilienblum, E., et al., "Optical 3d surface reconstruction by a multi-period phase shift method", *Journal of Computers*, Apr. 2007, pp. 73-83, vol. 25, Issue 2.
International Searching Authority, International Search Report (ISR) and Written Opinion for International Application No. PCT/DE2013/200023, dated Jan. 31, 2014, 23 pages, European Patent Office, The Netherlands.

\* cited by examiner

METHOD FOR CAPTURING IMAGES OF A PREFERABLY STRUCTURED SURFACE OF AN OBJECT AND DEVICE FOR IMAGE CAPTURE

CROSS REFERENCE TO RELATED APPLICATIONS

This application is a national stage application, filed under 35 U.S.C. § 371, of International Application No. PCT/DE2013/200023, filed Jun. 27, 2013, which claims priority to German Application No. 10 2012 211 381.9, filed Jun. 29, 2012, the contents of both of which as are hereby incorporated by reference in their entirety.

BACKGROUND

Technical Field

The invention relates to a method for the imaging of a surface, of an object, which is preferably structured, as well as to a corresponding device—preferably for applying the method. The term "structured surface" should be understood in the widest possible sense, comprising both flat surfaces as well as three-dimensional surfaces—for example molded surfaces and surfaces with texture. The term "imaging" should be understood in the sense of "image and shape detection," particularly in the sense of a 3D detection.

Description of Related Art

The method according to the invention is fundamentally an optical measurement method. Such optical measurement methods have gained more importance in recent years. In the near range in particular, 3D measurement technology has achieved a high state of development as a special measurement process.

Numerous methods for measuring surfaces are known, and used in the most various possible applications. For 3D area measurements at high precision, in addition to different laser scanning methods [S. Son, H. Park, K. H. Lee: Automated laser scanning system for reverse engineering and inspection. International Journal of Machine Tools and Manufacture, Volume 42, Issue 8, June 2002, pages 889-897] and the light section approach [Shirai, Yoshiaki and Motoi Suwa: Recognition of Polyhedrons with a Range Finder. In: Cooper, D. C. (publisher): Proceedings of the 2nd International Joint Conference on Artificial Intelligence, (London, UK, September, 1971), Conference Proceedings, pages 80-87, 1971] and most of all photogrammetric multi-step methods with active stripe projection, such as phase shifting [Lilienblum E., Michaelis, B.: Optical 3d surface reconstruction by a multi-period phase shift method. Journal of Computers (JCP), 2(2):73-83, April 2007] or time correlation [Albrecht, Peter; Michaelis, Bernd: Improvement of the Spatial Resolution of an Optical 3-D Measurement Procedure. In: IEEE Transactions on Instrumentation and Measurement Vol. 47. Brisbane, 1998, pp. 158-162] and single-step methods such as area correlation [Kanade, T.; Okutomi, M.: A stereo matching algorithm with an adaptive window: theory and experiment. In: IEEE Transactions on Pattern Analysis and Machine Intelligence 16 (1994), No. 9, pp. 920-932] are known.

In general, the foundation for achieving high measurement precision is the use of structured light [Valkenburg, R. J.; McIvor, A. M.: Accurate 3d measurement using a structured light system. In: Image and Vision Computing 16 (1998), No. 2, pp. 99-110]. Multi-step methods achieve spatial precision of up to $\frac{1}{10,000}$ of the measurement object size [Wiora, G.: Optische 3D-Messtechnik-Präzise Gestaltvermessung mit einem erweiterten Streifenprojektionsverfahren, University of Heidelberg, Dissertation, 2001]. The current market for stripe projection systems is characterized by multiple system manufacturers and a plurality of products. There is also a series of publications which relate to the classical stereo vision systems named above. Only by way of example, we hereby note DE 197 38 480 C1, DE 44 02 414 C2 and DE 199 28 341 C2. These systems have in common the fact that they use matrix camera systems and projectors and/or laser technology to generate the illumination light.

BRIEF SUMMARY

In order to measure larger surfaces while maintaining precision demands, it is necessary in all known systems based on the use of matrix cameras to make multiple measurement captures one after the other. For some applications, a robot-controlled measurement technique is available for this purpose. In general, simple translation and rotation with corresponding devices is used. Regardless of the methods used, problems particularly arise when there are large parts and/or surfaces. The movement of the imaging system must be stopped for each measurement capture (stop and go operation). The stop and go problem leads, as a result of the unavoidable settling of the capture system, to a significant delay in time. In addition, the start and stop processes increase the downtime and/or the start and stop processes reduce the service life/operating expectancy of the 3D measurement technology, and lead to increased wear on all mechanical components. In addition, problems are caused by vignetting and specular reflections. The existing technology is only suitable for industrial applications to a limited degree.

A further disadvantage of known multi-step methods (e.g. phase shift or time correlation) based on the use of matrix cameras is the high integration and reading time for the imaging. This generally leads to measurement times of more than 50 ms. As a result, particularly if there are oscillations of the measurement object surface of more than 10 Hz, significant systematic measurement errors arise according to the oscillation amplitude. This is particularly problematic in industrial production processes—e.g. in a pressing plant or in the measurement of continuous materials.

The problem addressed by the present invention is that of providing a method for imaging of a surface of an object, said surface preferably being structured, according to which it is possible to image the surface, at reproducible precision, in the briefest possible time. The method is intended most of all for application in continuous measurements as well. Likewise, a corresponding device is given.

The problem above is addressed by the features of the independent claims.

The method according to the invention for imaging of a preferably structured surface of an object uses at least one line scan camera for the purpose of scanning the surface. The surface is illuminated by structured light. Captured images are analyzed chronologically and/or spatially, optionally taking into account a relative movement between the line scan camera and the surface for the purpose of reconstructing the surface.

The device according to the invention addresses the problem above by the features of the independent device claim, according to which at least one line scan camera and at least one light source provide structured illumination of the surface.

The construction of an active optical 3D measuring system having line scan cameras is novel in the present invention. The invention is based on the construction of a special line scan camera for the purpose of imaging with a static or changing projection of suitable light patterns. The basis of the surface reconstruction is the time-dependent definition of an imaging function which supplies one ray in the measurement volume for each detected image point, taking into account the spatial movements of camera and measurement object. A special calibration for line scan cameras is necessary to define the imaging function. This is based on, for example, a calibration with lines which are arranged non-parallel to the scan line, with different angles at different heights, wherein the geometric position of the camera can be determined by the same. It should be noted in this context that the lines appear at characteristic points in the camera image as a result of the calibration field being captured in different positions by the line scan camera. Both a time-dependent and a static definition can be derived from these points.

Using this definition, corresponding image points can be found by chronological and/or spatial analysis of the captured images, said image points enabling a triangulation of 3D surface points in combination with the time-dependent imaging function. Suitable algorithms for searching the corresponding image points can be highly variable. They depend on the construction of the camera system, on the movement of the camera system, on the movement of the measurement object, and on the number and type of the projected patterns.

For certain applications, the use of line scan cameras with structured illumination for the 3D measurement of surfaces offers significant advantages compared to other measurement methods. The structured illumination makes the measurement method independent of a texture on the object surface. As such, the method differs from passive approaches—that is, from methods without structured illumination. The use of line scan cameras rather than matrix cameras makes it possible to scan the surface. This enables an application in continuous processes with continuously moving surfaces—such as material webs—as well as the efficient measurement of rotationally symmetric parts—for example shafts or rotating objects—as in the measurement of side walls of tires.

BRIEF DESCRIPTION OF THE FIGURES

At this point, there are various options for equipping and implementing the teaching of the present invention in an advantageous manner. For this purpose, reference is hereby made first to the dependent claims, and second to the following description of a preferred embodiment of the invention and to the drawing. In the context of the explanation of the preferred exemplary embodiment of the invention and of the drawing, other generally preferred embodiments and further developments of the teaching are explained as well. In the drawing:

DETAILED DESCRIPTION OF VARIOUS EMBODIMENTS

Figure 1:
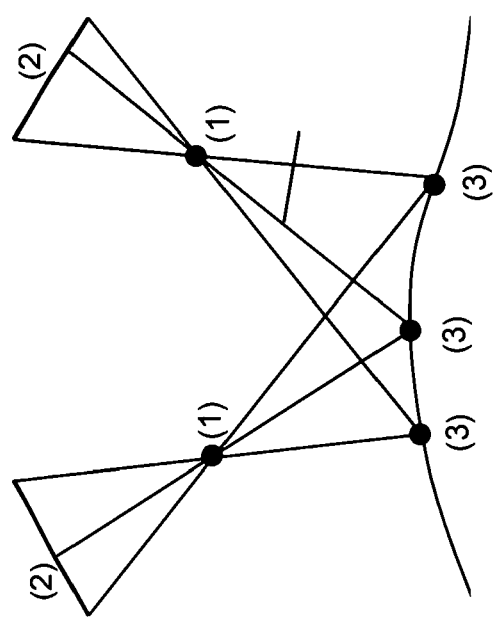
FIG. 1 shows a schematic, partial view of one embodiment of the basic arrangement of a device according to the invention, which uses the method according to the invention, based on the example of a camera system with two line scan cameras.

FIGS. 1 to 8 show different embodiments of the teaching according to the invention—on the one hand with respect to the device according to the invention, and on the other hand with respect to the method according to the invention. What is essential is that at least one line scan camera is used for the purpose of imaging a surface of an object (this can be a smooth surface or a structured 3D surface and/or surface with texture), particularly for the purpose of scanning the surface of the object. The surface is illuminated by structured light. The captured images are analyzed chronologically and/or spatially, taking into account a relative movement between the line scan camera and the surface, particularly for the purpose of reconstructing the surface using imaging and/or dimensioning.

The efficiency of the method with respect to calculating time and measurement precision depends decisively on the construction of the camera system. When systems with two or more cameras are used, it is advantageous to orient the cameras collinearly, as is illustrated by way of example in FIGS. 1 and 2. The projection centers 1 and the linear sensors 2 of all line scan cameras in the system span a common plane in this case. Corresponding image points—that is, pixels—image the same surface point 3, and are always detected at the same point in time as a result of the collinear orientation. If the line frequency and start time of all cameras is the same, corresponding image points are always in the same image line. As a result, it is possible to significantly simplify the algorithms for searching corresponding image points. In addition, if the projection of light patterns varies over time, this makes it possible to correlate the line-wise change in the light pattern in two cameras with each other spatially. For this purpose, grayscale values of individual image columns with known correlation functions are analyzed. Deviations from the collinearity of the camera system lead either to measurement error, or they must be separately taken into account in the algorithm for searching corresponding points.

For the collinear orientation, it is possible to capture a suitable shared, common pattern by means of the cameras.

Using iterative matching of the camera orientation, the cameras are adjusted in such a manner that both cameras capture the pattern at the same position. The pattern must have a discrete characteristic perpendicular to the line direction. The surface on which the pattern is found should possess a three-dimensional texture. Such a pattern can be generated by active illumination or texture on the object captured. For the orientation, a calibration field can also be used.

One concrete possibility for the searching of corresponding image points if the projection of light patterns varies over time, and the cameras are oriented collinearly, consists of using the zero-mean cross-correlation. Assume that G and G' are two different images of the line scan camera system, and $r_i = G(u, v+i)$ and $s_i = G'(u', v+i)$ are grayscale values of these images, wherein u and u' can also be real numbers, given corresponding horizontal sub-pixel interpolation. Then, for n different pattern projections with $$K(u, u', v) = \frac{\sum_{i=1}^{n}(r_i - \bar{r})(s_i - \bar{s})}{\sqrt{\sum_{i=1}^{n}(r_i - \bar{r})^2 \cdot \sum_{i=1}^{n}(s_i - \bar{s})^2}},$$

a correlation coefficient is obtained which gives the similarity of the pixels $G(u, \bar{v})$ and $G'(u', \bar{v})$ (the respective averages are indicated by $\bar{r}$, $\bar{s}$, and $\bar{v}$). The two pixels are then precisely corresponding image points if the correlation coefficient is maximum. Using triangulation, a depth value with respect to the camera system can be calculated directly therefrom. A vertical sub-pixel interpolation can be dispensed with, due to the collinearity of the cameras.

When sinusoidal light patterns are used, in the context of another embodiment, the correlation coefficient can also be calculated via the phase shift, according to the use in a phase shift method. If the phase angle for a sequence of grayscale values $q = (q_1, q_2, \ldots, q_n)$ is defined by $$\varphi(q) = \arctan_2\left(\sum_{i=1}^{n}\cos\left(\frac{2\pi i}{n}\right)q_i, \sum_{i=1}^{n}\sin\left(\frac{2\pi i}{n}\right)q_i\right),$$

then the desired correlation coefficient, taking into account the phase jump, is found by.

$$K(u, u', v) = \frac{1}{2\pi}\max\{|\varphi(s) - \varphi(r)|, 2\pi|\varphi(s) - \varphi(r)|\}$$

In order to ensure a maximum lateral resolution (area resolution) for the surface reconstruction, the scan speed and/or the line frequency should be selected such that the vertical resolution (in the scanning direction) corresponds to approximately a multiple of n of the horizontal resolution (in the line direction). This approach ensures that the local scan position, compared to the pixel size, does not significantly change over all $r_i$ and/or $s_i$.

Figure 3:
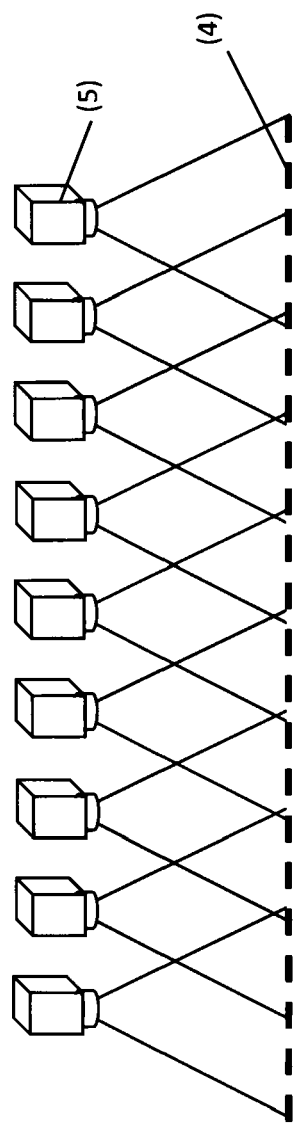
FIG. 3 shows a schematic, partial view of one embodiment of a device according to the invention, having programmable projectors arranged in parallel as the light sources.

In principle, the measurement method according to the invention can be used with any type of structured light. However, the measurement speed depends on the line frequency, and therefore on the light intensity and the projection of rapidly alternating pattern sequences. As a further design, a decentral pattern projection in three different variants is suggested for the structured illumination, as follows:

(i) Multiple programmable pattern projectors 5 are operated in parallel, as illustrated in FIG. 3. The light intensity of the projected patterns on the object surface 4 can be increased by overlapping, and a slight enlargement. In order to achieve high measurement speed, the programmable projectors 5 must be capable of generating accordingly rapid pattern sequences.

Figure 4:
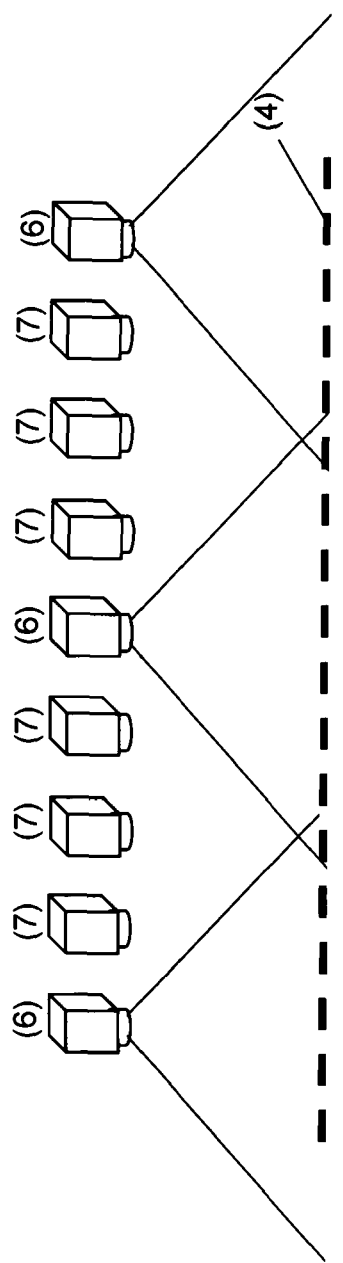
FIG. 4 shows a schematic, partial view of one embodiment of a device according to the invention, having static projectors arranged in parallel as the light sources.

(ii) Multiple static pattern projectors are operated in parallel. In contrast to (i), different light patterns are generated in this case by switching individual projectors on and off. In FIG. 4, the light pattern 4 is generated on the object surface by several switched-on projectors 6. All other projectors 7 are switched off, and therefore do not generate any light pattern. If the projectors 6 are switched off, and accordingly several of the other projectors 7 are switched on, other patterns can be generated. In order to achieve a high measurement speed, the projectors must be able to be switched accordingly rapidly.

Figure 5:
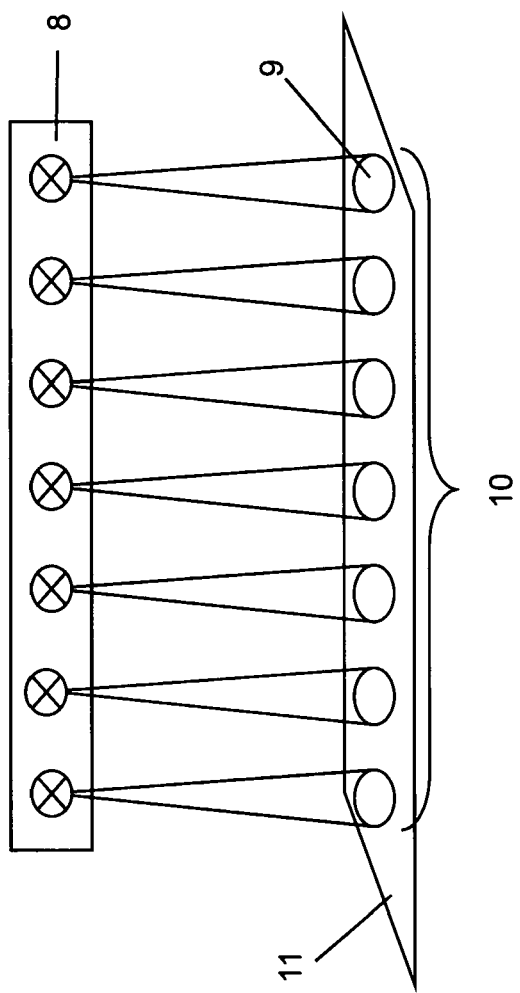
FIG. 5 shows a schematic, partial view of one embodiment of a device according to the invention, wherein the light patterns in this case are generated by light spots.

(iii) The needed patterns are composed of individual light spots. In FIG. 5, an illumination 8 is illustrated which generates a light pattern 10 on the measurement object surface 11 using a plurality of light spots 9. In principle, the construction is not bound to the manner of generation of the spot.

Figure 6:
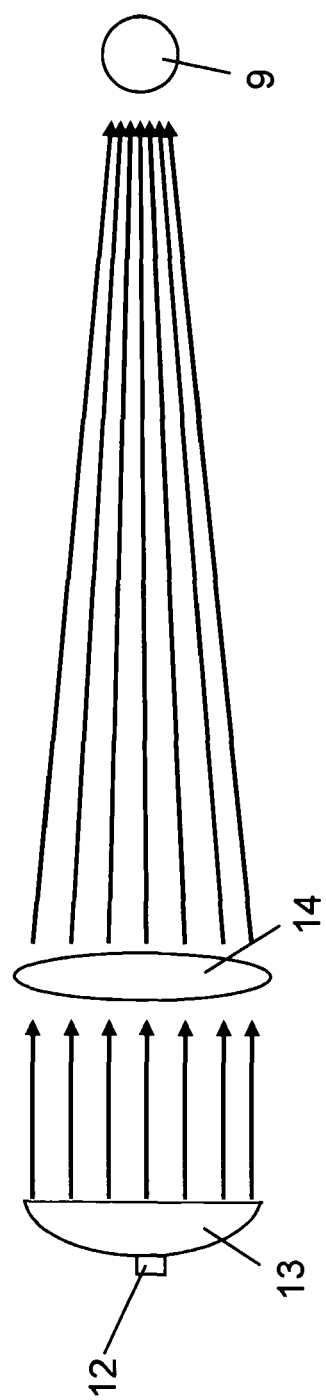
FIG. 6 shows a schematic, partial view of one embodiment of a device according to the invention, wherein a single light spot is generated in this case.

In FIG. 6, an embodiment is illustrated to show how an LED light spot can be generated, wherein the light of one LED 12 is focused via a reflector 13 and a lens 14 onto a single light spot 9.

Figure 7:
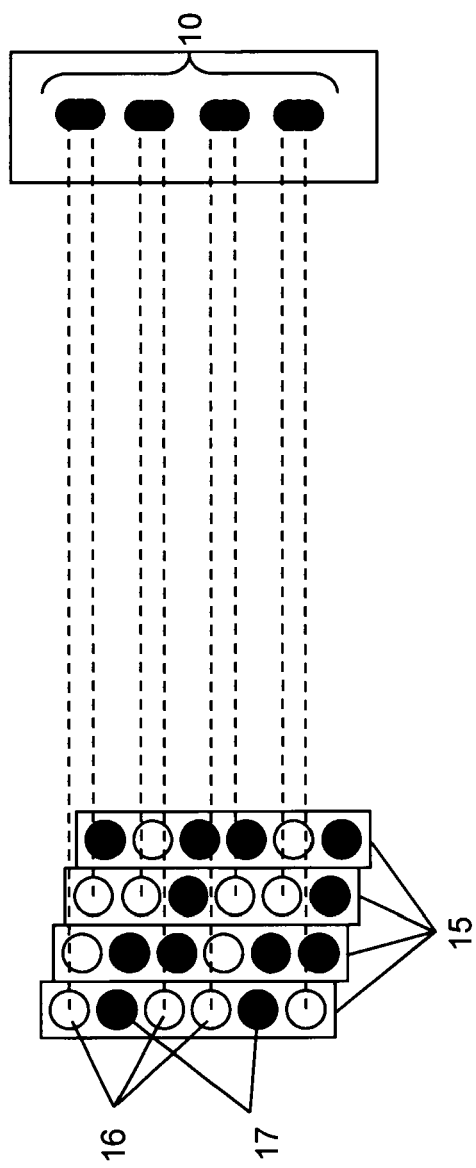
FIG. 7 shows a schematic, partial view of one embodiment of a device according to the invention, wherein overlapping light spot patterns in this case are generated by arranging multiple rows of light spots.
Figure 8:
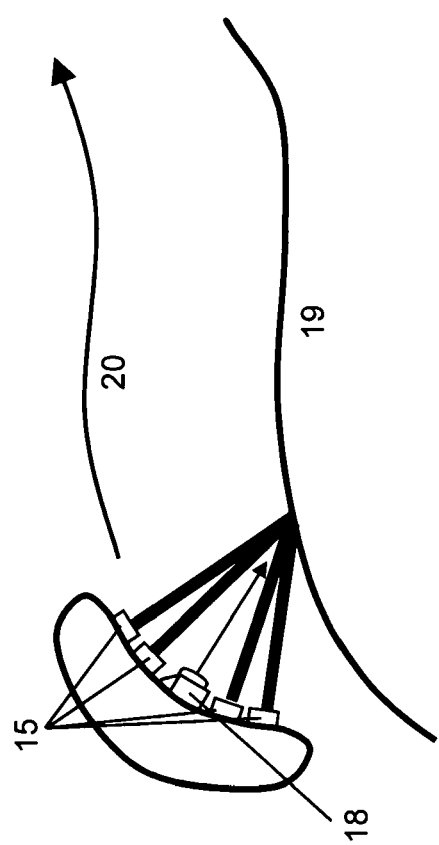
FIG. 8 shows a schematic view of a fully illustrated embodiment of a device according to the invention, wherein a sensor system is included in this case, having spot illumination.

In order to generate differently-positioned patterns, multiple light spot strands 15 can be arranged with a slight offset to each other, as is illustrated in FIG. 7. As a result, light patterns 10 are created on the object surface by switching on individual spots 16 and/or switching off individual light spots 17. In order to obtain a focusing of the light spot onto a line, the light spot strands 15 are optionally slightly rotated inward, as can be seen in FIG. 8. By way of example, a sensor is illustrated here, along with line scan cameras 18, light spot strands 15, the measurement object surface 19, and the scan movement 20.

Figure 2:
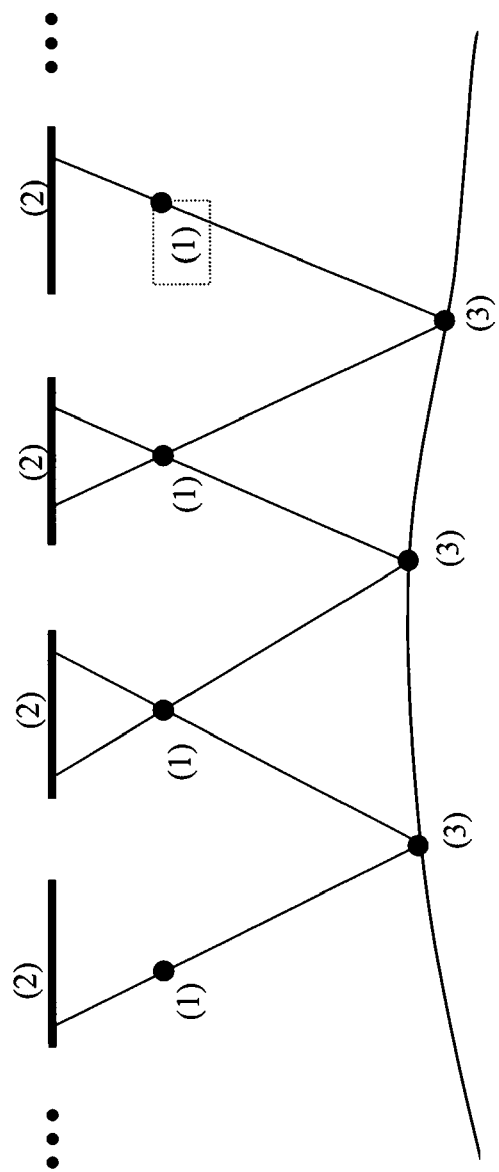
FIG. 2 shows a schematic, partial view of one embodiment of the basic arrangement of a device according to the invention, which uses the method according to the invention, based on the example of a camera system with multiple line scan cameras.

Using the suggested technique for decentral pattern projection, it is possible to scale the width of the system up or down, by adding further cameras, as shown in FIG. 2, as well as corresponding illumination systems, as are shown in FIGS. 3-5. In this manner, it is possible to adapt the requirements with respect to measurement volume, measurement resolution, and measurement speed of the method for numerous 3D applications, without needing to change the approach of the method.

It is possible to carry out the measurement method at very high line frequencies using all three variants for the illumination, thereby producing, in addition to the measurement speed itself, a further advantage. As a result of a short integration time, which is an unavoidable consequence of high line frequency, it is possible to largely avoid movement blurs even with measurement objects which move quickly. As a result, it is also possible to detect the surfaces of objects on moving conveyor belts, by way of example, very well. In addition, it is possible to largely avoid measurement errors when there are vibrations, because a movement blur can only become apparent at an accordingly high frequency of the measurement object surface. At high frequencies, however, the amplitude of the vibration is generally so small that it no longer has any effect on the measurement precision. This is a substantial difference from known multi-step methods using matrix cameras.

In addition to the three variants named for illumination, other constructions are also possible. Dynamic light patterns can also be generated by a projection via moving mirrors. The patterns can also be generated by means of special light sources, such as lasers. In addition, it should be noted that the pattern sequences need not necessarily be reproducible. The generation of the pattern can also be performed using stochastic methods. By way of example, patterns can be generated by exploiting the inherent texture of the illumination source, or by artifacts of the illumination source itself, or in the projection process. This must be accordingly taken into account in the optical measurement method.

The measurement method can also be carried out in principle using only one camera. However, a special calibration of the illumination is needed in such a case. One possibility for the calibration is that of detecting the shape of the light pattern according to its spatial position, and storing the same in a lookup table. Then, in the actual measurement, the depth information is deduced from the detected shape of the light pattern via the lookup table.

Additional possibilities for applying the measurement method are provided by constructions with beam splitting lenses. In this case, the beam path is manipulated during the imaging process in such a manner that the image of one camera is formed via various real or virtual projection centers 1, thereby enabling a triangulation for the purpose of calculating 3D points.

The method can also be used in the context of deflectometric measurement principles. In this case, the illumination is applied in such a manner that the specular fraction of the reflection on the surface is captured by the cameras, and provides the basis for the 3D surface reconstruction.

In addition, for deflectometric applications, the pattern can first be projected onto a diffusely reflecting surface (e.g. a matte sheet or canvas), and then the mirror image of this illumination auxiliary surface is indirectly captured on the object surface by the cameras, and analyzed.

In summary, it can be stated again that the invention relates to a device and to a method, according to which the 3D shapes of a surface can be reconstructed line by line by means of contactless scanning of surfaces (relief, structure, texture, etc.). The invention is particularly used in fields in which there is a necessity of detecting the shape and texture of large surfaces with high precision and high speed. The invention is particularly suited for application in the field of surface testing technology. It is possible, by means of a continuous scanning process, to carry out a continuous verification in a real-time operation mode, given a corresponding production process. In addition, the measurement device can be scaled up or down to any arbitrary scanning width, by linking together multiple line scan cameras.

As regards further advantageous embodiments of the device according to the invention, reference is hereby made for the purpose of avoiding repetition to the general portion of the description and to the attached claims.

Finally, explicit reference is made to the fact that the exemplary embodiments of the device according to the invention described above are used only for explanation of the claimed teaching, but the teaching is not restricted to the exemplary embodiments.

LIST OF REFERENCE NUMBERS 1 projection center
2 linear sensor
3 surface point
4 light pattern, object surface
5 programmable projector
6 projectors (switched on)
7 projectors (switched off)
8 illumination
9 light spot
10 light pattern
11 measurement object surface
12 LED
13 reflector
14 lens
15 light spot strand
16 spot (switched on)
17 spot (switched off)
18 line scan camera
19 measurement object surface
20 scan movement

The invention claimed is:

1. A method for imaging of a structured surface of an object, said method comprising the step of:
using at least two line scan cameras to scan the surface and capture images of the surface, wherein:
the surface is illuminated with structured light;
the captured images are analyzed at least one of chronologically or spatially, taking into account a relative movement between the at least two line scan cameras and the surface so as to reconstruct the surface in a three-dimensional manner;
corresponding image points in each of the captured images are searched for via a cross-correlation function, wherein a maximum value of a correlation coefficient obtained via the cross-correlation function determines the corresponding image points;
a triangulation of at least three surface points is performed based upon said determined corresponding image points in combination with an imaging function, the at least three surface points being at least three corresponding non-collinear three-dimensional surface points and the triangulation calculating a depth value with respect to the at least two line scan cameras;
the at least two line scan cameras have a co-planar arrangement and are oriented at angles and positions relative to and toward one another, with projection centers and linear sensors of each of the at least two line scan cameras confined within and spanning a common plane relative to one another;
a common pattern is captured via the at least two line scan cameras;
the at least two line scan cameras are adjusted so that the at least two line scan cameras both capture the common pattern at a single position;
the at least two line scan cameras each simultaneously image the at least three surface points, such that the corresponding image points each image the at least three surface points and are always detected at the same point in time;
the angles and positions of the at least two line scan cameras relative to and toward one another define an overlapping region; and
the simultaneous imaging and the triangulation of the at least three surface points occurs only within the overlapping region.

2. A method according to claim 1, wherein the structured illumination includes at least one of a static or time-variable projection of light patterns onto the surface.

3. A method according to claim 1, wherein the structured illumination is generated by multiple light sources arranged parallel to each other, wherein individual light patterns overlap each other.

4. A method according to claim 3, wherein at least one of a reflector or a lens is arranged in front of the light sources, the reflector or the lens are configured for ensuring a constancy of the light pattern over a predetermined depth range.

5. A method according to claim 1, wherein static light patterns are projected, wherein different light patterns are generated by a switching on and off of the light sources.

6. A method according to claim 1, wherein at least one of the light pattern or a chronological sequence of the light pattern is programmed.

7. A method according to claim 1, wherein the structured illumination is made up of individual LED spots, wherein different light patterns are generated by direct control of the individual LED spots.

8. A method according to claim 1, wherein the surface is captured in a sequence of lines with alternating pattern projections, such that specific sequences of grayscale values are obtained for each captured image point and analyzed photogrammetrically.

9. A method according to claim 8, wherein corresponding image points are searched via the cross-correlation function using the specific sequences of grayscale values obtained.

10. A method according to claim 9, wherein the cross-correlation function is used in combination with a phase shift algorithm.

11. A method according to claim 1, wherein said imaging function reconstructs the surface, said imaging function supplying one ray in a measurement volume for at least one of each image or for each image point, taking into account the relative movement of at least one of the line scan cameras or the object.

12. A method according to claim 1, wherein the imaging function is defined with respect to time.

13. A method according to claim 1, wherein the cameras are
adjusted by iterative matching of each camera orientation relative to and toward one another.

14. A method according to claim 1, wherein the corresponding image points are positioned in a single image row if a line frequency and start time of the line scan cameras are the same.

15. A method according to claim 1, wherein if projection of light patterns varies over time, a line-by-line change in the light patterns correlates by location in two line scan cameras.

16. A method according to claim 1, further comprising use of deflectometric measurement principles, wherein the illumination is used such that a specular fraction of a reflection on the surface is captured by the cameras, and provides a basis for the imaging.

17. A method according to claim 16, wherein the illumination, with addition of additional scattering surfaces, is used such that the specular fraction of the reflection on the object surface being captured is detected by the cameras, and provides the basis for the imaging.

18. A method according to claim 1, wherein a light pattern is generated at least one of: by the projection via moving mirrors, by means of special light sources such as lasers, by way of example, or by stochastic methods.

19. A device for imaging a structured surface of an object by applying the method according to claim 1, said device further comprising at least one light source for the purpose of structured illumination of the surface, wherein the captured images are analyzed at least one of chronologically or spatially, taking into account a relative movement between the at least two line scan cameras and the surface, so as to reconstruct the surface.

20. A device according to claim 19, wherein the at least two line scan cameras form a camera system.

21. A device according to claim 19, wherein at least one of lasers or LED elements are used for generating the structured illumination.

22. A method according to claim 1, wherein the common pattern is a calibration field.

23. A method according to claim 1, further comprising calculating a depth value with respect to the at least two line scan cameras.

24. A method according to claim 1, wherein the cross-correlation function is a zero-mean cross-correlation function.

25. A method according to claim 24, wherein the cross-correlation function defines a correlation coefficient (K) representing a similarity of the corresponding image points, the correlation coefficient being calculated by:

$$K(u, u', v) = \frac{\sum_{i=1}^{n}(r_i - \bar{r})(s_i - \bar{s})}{\sqrt{\sum_{i=1}^{n}(r_i - \bar{r})^2 \cdot \sum_{i=1}^{n}(s_i - \bar{s})^2}},$$

wherein:
n=a value of different pattern projections;
G and G' are two different images captured by the at least two line scan cameras;
$r_i$=G(u, v+i) and $s_i$=G'(u', v+i) are grayscale values of the two different images;
u is a pixel index of a first of the at least two line scan cameras;
u' is a pixel index of a second of the at least two line scan cameras;
i is a clock step;
v is a time when i=0;
$\bar{r}=1/n\sum_{i=1}^{n}r_i$; and
$\bar{s}=1/n\sum_{i=1}^{n}s_i$.

* * * * *

UNITED STATES PATENT AND TRADEMARK OFFICE
CERTIFICATE OF CORRECTION

PATENT NO. : 10,869,020 B2  
APPLICATION NO. : 14/411706  
DATED : December 15, 2020  
INVENTOR(S) : Wolfram Schmidt et al.

Page 1 of 1

It is certified that error appears in the above-identified patent and that said Letters Patent is hereby corrected as shown below:

On the Title Page

Item (71) change "Applicants" to --Applicant-- and remove "; Thomas Casper, Magdeburg (DE)"

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*